Aug. 15, 1939.  M. KIESSLING ET AL  2,169,609
METHOD OF MAKING TWO-PART STOPS FOR SEPARABLE SLIDE FASTENER TAPES
Original Filed May 11, 1936  2 Sheets-Sheet 1
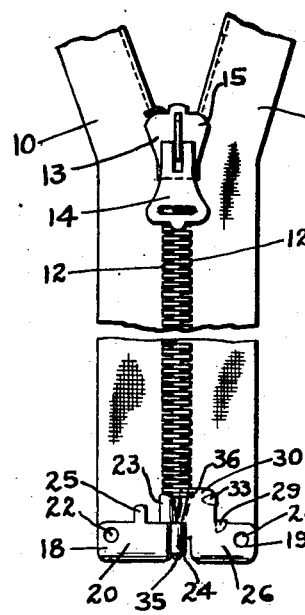
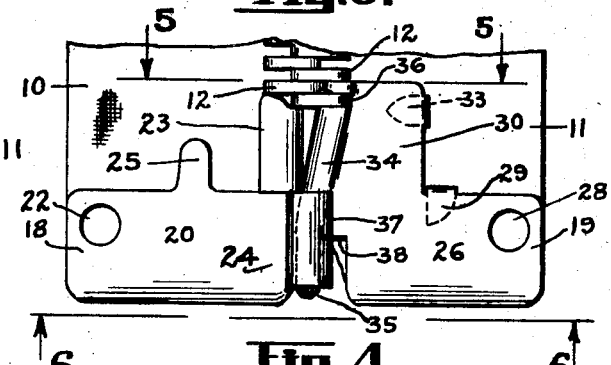
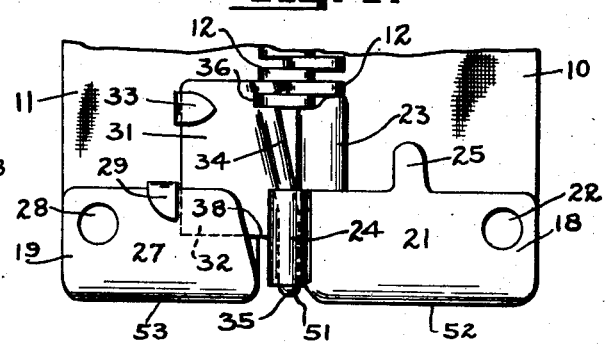
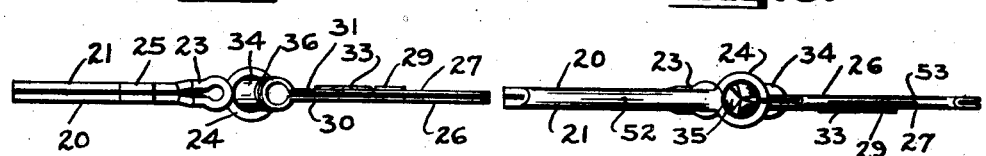
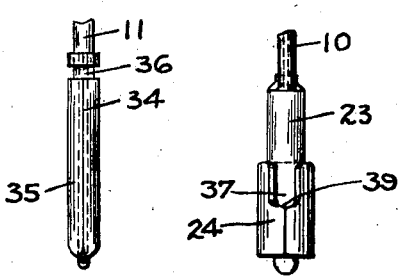
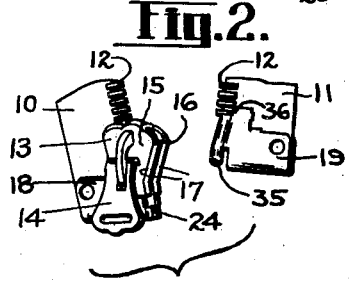
Inventor
Max Kiessling.
Adolph Krieger.
H. G. Manning
Attorney Aug. 15, 1939.  M. KIESSLING ET AL  2,169,609
METHOD OF MAKING TWO-PART STOPS FOR SEPARABLE SLIDE FASTENER TAPES
Original Filed May 11, 1936   2 Sheets—Sheet 2
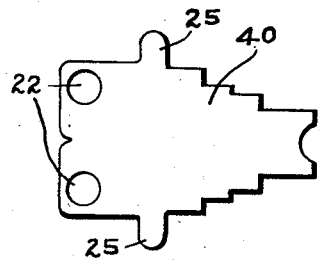
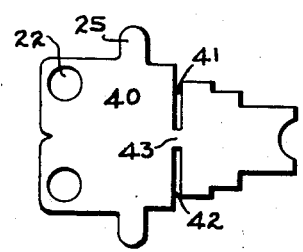
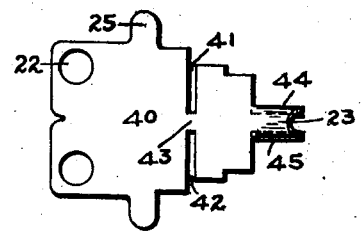
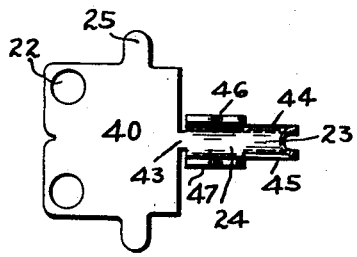
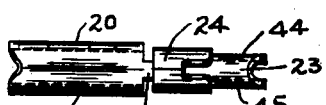
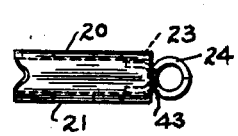
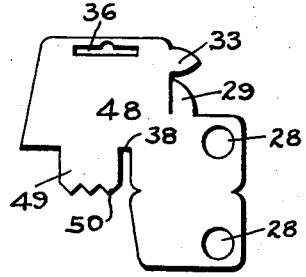
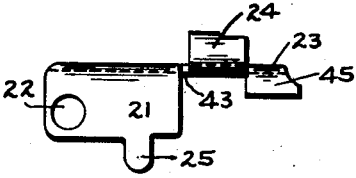
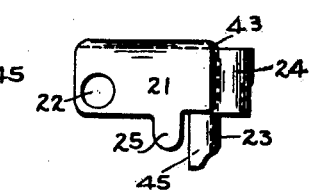
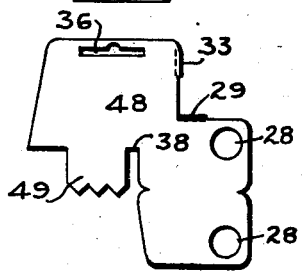
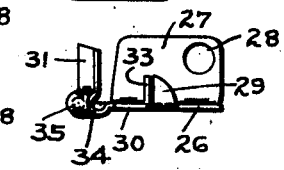
Inventor
Max Kiessling.
Adolph Krieger.
H. G. Manning
Attorney Patented Aug. 15, 1939

2,169,609

UNITED STATES PATENT OFFICE 2,169,609

METHOD OF MAKING TWO-PART STOPS FOR SEPARABLE SLIDE FASTENER TAPES

Max Kiessling and Adolph Krieger, Waterbury, Conn.

Original application May 11, 1936, Serial No. 78,990. Divided and this application October 23, 1936, Serial No. 107,196

1 Claim. (Cl. 29—148)

This invention relates to methods of making separable slide fastener tapes, and more particularly to a two-part stop for use in detachably holding the ends of a pair of slide fastener tapes together.

In the use of slide fastener tapes of the above nature having rows of cooperating fastener elements along the opposing edges of the tapes, and in which said elements are adapted to be interlocked by the movement of a slide member, it has been found in many instances that the last element of the row at the end of a tape became loosened, and either shifted out of its proper position or was pulled off, resulting in premature separation of the ends of said tape.

One object of this invention is to provide a method of making a two-part stop of the above nature whereby the ends of the tapes will be fitted closely and neatly together in an easy and positive manner.

Another object is to provide a method of making a device of the above nature which, when clamped at the ends of the slide fastener tapes, will prevent the last fastener element from being moved out of position or pulling off.

Still another object is to provide a method of making a detachable stop of the above nature consisting of a pair of cooperating male and female members, each of which is made from a single piece of metal.

A further object of this invention is to provide a method of making the female member of the detachable stop.

A still further object is to provide a method of making a detachable stop of the above nature which will be simple in construction, inexpensive to manufacture, easy to manipulate, compact, ornamental in appearance, and very efficient and durable in use.

With these and other objects in view, there has been illustrated on the accompanying drawings one form in which the invention may be conveniently embodied in practice.

In the drawings:

Fig. 1 illustrates a pair of interlocked fastener element tapes having the improved detachable stop assembled at the lower ends thereof.

Fig. 2 is a fragmentary view of the lower ends of said tapes as they appear when separated.

Fig. 3 is an enlarged front view of the lower ends of the tapes showing the detachable stop members in assembled position.

Fig. 4 is a similar enlarged view of the same taken from the rear.

Fig. 5 is an enlarged edge view taken on the line 5—5 of Fig. 3 with the tapes removed, looking downwardly.

Fig. 6 is an enlarged bottom edge view of the parts shown in Fig. 3, looking upwardly in the direction of the arrows 6—6.

Fig. 7 is an enlarged side edge view of the male member of the stop.

Fig. 8 is an enlarged side edge view of the female member of the same.

Figs. 9 to 16 inclusive are views showing the appearance of the blank after the successive steps in the method of making the female member of the stop.

Figs. 17 to 21 inclusive are similar views showing the appearance of the blank after the successive steps employed in the method of making the male member of the stop.

This application is a division of a prior application by the same inventors filed May 11, 1936, Serial No. 78,990, entitled "Two-part stops for separable slide fastener tapes."

Referring now to the drawings in which like reference numerals denote corresponding parts throughout the several views, the fastener element tapes upon the ends of which the detachable male and female members of the improved stop are applied comprise a pair of narrow elongated beaded fabric strips or stringers 10 and 11, each having a row of forked jaw elements 12 clamped upon the beaded edges thereof, and said rows of elements are adapted to be interlocked for connecting the tapes together by the camming action of a tapered slide 13 mounted thereon, when it is pulled upwardly from the lower end thereof, as viewed in Fig. 1. The rows of connected elements 12 are adapted to be disengaged from each other to permit separation of the tapes by moving the slide 13 in the reverse direction, all of which is in accordance with the well known practice in this art.

Each element 12 is provided with a pair of opposed jaws which are crimped inwardly upon the edges of the tapes by suitable clamping tools not shown. The slide 13 is preferably provided with a hinged finger piece 14 to facilitate the manipulation thereof, said slide preferably having a pair of parallel spaced plates 15 and 16 adapted to embrace the rows of elements 12 therebetween. The side plates 15 and 16 are provided on both side edges with inwardly extending side flanges 17 for confining the elements 12 and forcing them together into cooperating engagement.

The detachable male and female members 18 and 19 of the stop forming the present invention are shown in Fig. 1 in assembled position applied to the bottoms of a pair of tapes 10 and 11. Each of the members 18 and 19 is preferably made of one piece of material, such as a blank of sheet metal, formed and attached to the tapes according to the methods to be hereinafter described.

Female stop member

The female member 18 includes a pair of opposed tape-embracing plates 20 and 21 having alined openings 22 therein which, when the member is attached to the tape, serve to facilitate the attachment of the tape to the edge of the article to be closed. Above the plates 20 and 21 and disposed along the edge of the tape abutting the elements 12, a tubular clip 23 is provided which embraces the tape edge and is securely crimped thereto. The clip 23 extends upwardly from the plates 20 and 21 to a point closely adjacent the last element 12 upon the end of the left-hand tape 10 to which the member 18 is attached, as viewed in Fig. 1. Below the clip 23 and with its axis in alinement with the line of jointure of the two rows of elements 12 on the tape edges, a hollow intermediate cylindrical socket 24 is provided. Provision is also made of a pair of slider-guiding ears 25, one of which extends upwardly from each of the plates 20 and 21 on opposite faces of the tape 10.

Male stop member

The male member 19 also has opposing tape-embracing plates 26 and 27, similar to the plates 20 and 21 of the female member; and said plates 26 and 27 are likewise provided with circular openings 28 to facilitate securing the tape 11 to the article to be closed. The plate 26 has an upstanding pointed prong 29 formed on its upper edge which is adapted to be passed through the tape 11 and then bent over and pressed down upon the rear surface of the plate 27 to secure said plates to the tape 11. The plate 26 has a pair of spaced upwardly directed side plates 30 and 31 extending from its upper edge and adapted to embrace the center edge of the tape 11 for reinforcing the same. The lower left-hand corner 32 of the side plate 31 is preferably disposed beneath the plate 27, as clearly shown in Fig. 4. Provision is also made of a pointed prong 33, formed on the rear edge of the side part 30, which is adapted to pass through the tape 11 and be bent over and pressed down upon the outer surface of the opposite side plate 31 to firmly connect the opposing tape embracing plates 30 and 31. The tubular edge portion 34 connecting the side plates 30 and 31 is curved and inclined outwardly slightly from top to bottom and is extended downwardly from the lower edge of these plates in the form of a cylindrical vertical tongue 35 for cooperative engagement with the socket 24. The tongue 35 is spaced from the lower edges of the plates 26 and 27 by a slot 36 with its axis in alinement with the line of jointure of the interlocking rows of elements 12 on the tape edges above it.

The inclined tubular portion 34 extends above the last element 12 on the tape 11 and is slotted, as at 36, to straddle the same. When in assembled position, the rolled tongue 35 of the male member 19 fits within the socket 24 of the female member 18, thereby detachably connecting the opposing lower ends of the tapes 10 and 11. A slot 37 is provided in the meeting edges of the socket 24 to provide clearance for the side plates 30 and 31 of the male member of the stop. The upper end of the slot 38 is adapted to abut against a shoulder 39 at the bottom of said slot 37 to hold the male and female members 19 and 18 in their relative positions, as shown in Figs. 1, 3 and 4, whereby the rows of elements 12 on the opposing tape edges will be properly interlocked when the slide 15 is moved upwardly.

Method of making the female stop member

The steps in the method of making the female member 18 are illustrated in Figs. 9 to 16, inclusive. Thus, a blank of metal 40 is first stamped out into the shape shown in Fig. 9. The openings 22 and the ears 25 are completely formed in this operation. In Fig. 10, the result of a shearing operation by suitable tools, not shown, is illustrated, whereby a pair of opposing slots 41 and 42 are formed in the blank 40 leaving a narrow intermediate connecting neck 43. Fig. 11 illustrates the result of the next operation whereby one end of the blank 40 is acted upon by suitable forming and shearing tools (not shown) to bend down portions thereof to provide a pair of sides 44 and 45 for the clip 23, which is U-shaped in cross-section so that it may be fitted over the edge of the tape 10 and be crimped thereto by closing the sides 44 and 45 together.

Fig. 12 illustrates the result of the next operation in which the intermediate portion of the blank 40 adjacent the clip 23 is bent up by suitable forming tools to form a pair of parallel side portions 46 and 47. In Figs. 13 and 14, the result of another operation is shown whereby the side portions 46 and 47 are closed together as by forming tools, not shown, into tubular form, preferably around a mandrel, not shown, to complete the socket 24 and provide the slot 37 and its bottom shoulder 39. The material of the blank 40 has also been acted upon during this step by suitable forming tools to bend up the side plates 20 and 21 into parallelism. Figs. 15 and 16 illustrate the results of the next step wherein the blank is bent as by forming tools, not shown, at the neck 43 in such a manner that the clip 23 and the socket 24 will assume a position at right-angles to the side plates 20 and 21. The final product resulting from the next and last operation is illustrated in Figs. 3 and 4 wherein the side plates 20 and 21 are shown embracing the tape 10, and with the clip 23 crimped tightly to the ribbed edge of the tape 10 below and abutting the last element 12 thereon. The forming and shearing tools mentioned above have not been shown on the drawings as it is thought that they would be obvious to any workman skilled in this art from a mere inspection of the drawings.

Method of making the male stop member

The steps in the method of making the male member 19 are illustrated in Figs. 17 to 21, inclusive. Thus, Fig. 17 shows a blank 48 stamped out of sheet metal by the first or blanking operation. The openings 28, the prongs 29 and 33, the slot 36, and a portion 49 from which the tubular tongue 35 is rolled are all blanked out in the first step. The next operation results in bending down the prongs 29 and 33 at right-angles to the blank 48, as shown in Fig. 18. Fig. 19 illustrates the appearance of the blank 48 after the next step wherein the side plates 30 and 31 are bent, as by forming tools at right-angles to each other, and the inclined tubular portion 34 and the vertical tongue 35 are partially formed.

Figs. 20 and 21 show the results of the next operation whereby the side plates 26 and 27 are bent at right-angles to each other and the inclined tubular portion 34 and the tongue 35 are more completely formed. The tooth-like projections 50 of the tongue 49 are bent inwardly, as by forming tools, to form a blunt point 51 at the end of the tongue 35 to facilitate its insertion into the socket 24 of the female member 18.

The final appearance of the male stop member 19 is illustrated in Figs. 3 and 4, wherein the plates 26 and 27 and the side plates 30 and 31 embrace the tape 11, and are pressed together firmly against the same, the prongs 29 and 33 being passed through said tape and bent over, as by forming tools, into engagement with the plate 27 and the side plate 31, respectively. This last step completes the tubular portion 34 and the tongue 35 and also disposes the male member 19 upon the tape end with the lowest element 12 in the slot 36.

*Operation*

In operation, in order to connect the tapes 10 and 11, the slide 13, which is permanently retained on the tape 10, will first be pushed downwardly as far as it will go until it strikes the socket 24 of the female member 18. The tongue 35 of the male member 19 will then be inserted through the plates 15 and 16 of the slide and into the socket 24. The slide 13 will next be pulled upwardly while holding the male member 19 firmly, causing the rows of elements 12 to be securely interlocked together. When connecting the members 18 and 19 of the slide stop, as above described, the male member 19 should be pressed downwardly with sufficient force to insure that the edge of the slot 38 of the side plates 30 and 31 engages against the shoulder 39 of the slot 37 in the female member 18, thus positioning the lowest elements 12 on the tapes 10 and 11 properly to be interengaged by the cam slide 13 during its upward movement therealong.

The curved bottom portion 52 connecting the side plates 20 and 21 of the female member 18 serves to protect the lower end of the tape 10 against fraying. Likewise, the curved bottom section 53 connecting the side plates 26 and 27 of the male member 19 also protects the end edge of the tape 11. The clip 23 which is clamped along the edge of the tape 10 stiffens and reinforces said tape at this point and prevents loosening of the lower adjacent element 12. The side plates 30 and 31 of the male member reinforce and stiffen the tape 11 adjacent the lowermost element 12, and the slot 36 prevents the lowermost element 12 on the tape 11 from loosening or becoming dislocated. The prongs 29 and 33 securely maintain the male member 19 in proper positon on the tape 11.

While there has been disclosed in this specification one form in which the invention may be embodied and a preferred method of making the same, it is to be understood that this form and method are shown and described for the purpose of illustration only, and that the invention is not to be limited to the specific disclosure, but may be modified and embodied in various forms without departing from its spirit. In short, the invention includes all the modifications and embodiments coming within the scope of the following claim.

Having thus fully described the invention, what is claimed as new, and for which it is desired to secure Letters Patent, is:

The method of making the female member of a two-part stop for the slide of a pair of separable slide fastener tapes, which comprises shearing a blank from flat sheet metal, bending one end portion of said blank in one direction to form a bead embracing clip, bending an intermediate portion of said blank in the opposite direction and forming it into a tubular socket for the prong of the male member, bending the other end portion of the blank in the same direction as said clip to embrace the sides of one of said tapes, and then swinging said socket and clip as a unit in the same plane through a right-angle to cause said clip and socket to abut adjacent sides of said tape embracing end portion.

MAX KIESSLING.
ADOLPH KRIEGER.